(12) United States Patent
Chen et al.

(10) Patent No.: US 8,055,849 B2
(45) Date of Patent: Nov. 8, 2011

(54) REDUCING CACHE POLLUTION OF A SOFTWARE CONTROLLED CACHE

(75) Inventors: Tong Chen, Yorktown Heights, NY (US); Marc Gonzalez tallada, Yorktown Heights, NY (US); Zehra N. Sura, Yorktown Heights, NY (US); Tao Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 12/062,587

(22) Filed: Apr. 4, 2008

(65) Prior Publication Data

US 2009/0254711 A1 Oct. 8, 2009

(51) Int. Cl.
*G06F 12/12* (2006.01)

(52) U.S. Cl. ............... 711/136; 711/137; 711/E12.002; 712/207

(58) Field of Classification Search ............... 711/133, 711/136, 137, E12.002; 712/207
See application file for complete search history.

(56) References Cited

U.S. PATENT DOCUMENTS

| | | | |
|---|---|---|---|
| 5,796,971 A | 8/1998 | Emberson | |
| 5,809,566 A | 9/1998 | Charney et al. | |
| 5,838,945 A | 11/1998 | Emberson | |
| 5,940,838 A | 8/1999 | Schmuck et al. | |
| 6,578,130 B2 | 6/2003 | Barrick et al. | |
| 6,721,943 B2 | 4/2004 | Krishnaiyer et al. | |
| 6,728,837 B2 * | 4/2004 | Wilkes et al. | 711/133 |
| 6,772,415 B1 | 8/2004 | Danckaert et al. | |
| 7,155,575 B2 | 12/2006 | Krishnaiyer et al. | |
| 7,243,195 B2 | 7/2007 | O'Brien et al. | |
| 2003/0105926 A1 * | 6/2003 | Rodriguez | 711/129 |
| 2005/0102294 A1 | 5/2005 | Coldewey | |
| 2006/0090036 A1 * | 4/2006 | Zohar et al. | 711/133 |
| 2007/0005901 A1 | 1/2007 | Kellar | |
| 2007/0130428 A1 * | 6/2007 | Ohba | 711/137 |
| 2008/0005473 A1 | 1/2008 | Chen et al. | |
| 2009/0049256 A1 * | 2/2009 | Hughes et al. | 711/158 |
| 2009/0254733 A1 | 10/2009 | Chen et al. | |
| 2009/0254895 A1 | 10/2009 | Chen et al. | |

OTHER PUBLICATIONS

Vellanki et al., "A Cost-Benefit Scheme for High Performance Predictive Prefetching", SC'99, ACM, 1999, pp. 1-18.

(Continued)

*Primary Examiner* — Matt Kim
*Assistant Examiner* — Ralph A Verderamo, III
(74) *Attorney, Agent, or Firm* — Francis Lammas; Stephen J. Walder, Jr.; Matthew B. Talpis

(57) ABSTRACT

Reducing cache pollution of a software controlled cache is provided. A request is received to prefetch data into the software controlled cache. A first designator is set for a first cache access to a first value. If there is the second cache access to prefetch, a determination is made as to whether data associated with the second cache access exists in the software controlled cache. If the data is in the software controlled cache, a determination is made as to whether a second value of a second designator is greater than the first value of the first cache access. If the second value fails to be greater than the first value, the position of the first cache access and the second cache access in a cache line is swapped. The first value is decremented by a predetermined amount and the second value is replaced to equal the first value.

20 Claims, 8 Drawing Sheets

OTHER PUBLICATIONS

Ramachandran et al., "Architectureal mechanisms for explicit communication in shared memory multiprocessors", Proceedings of the 1995 ACM/IEEE Supercomputing Conference, Dec. 3-8, 1995, vol. 2, pp. 1737-1775.

Lu et al., "The Performance of Runtime Data Cache Prefetching in a Dynamic Optimization System", Proceedings of the 36th International Symposium on Microarchitecture (MICRO-36'03), IEEE, 2003, 11 pages.

Bernstein et al., "Context-based prefetch—an optimization for implementing objects on relations", The VLDB Journal (2000) 9: 177-189.

Knight et al., "Compilation for Explicitly Managed Memory Hierarchies", PPoPP'07, ACM, Mar. 14-17, 2007, pp. 226-236.

Cantin et al., "Stealth Prefetching", ASPLOS'06, ACM, Oct. 21-25, 2006, pp. 274-282.

Chen et al., "Prefetching Irregular References for Software Cache on Cell", ACM, CGO'08, Boston Massachusetts, Apr. 5-10, 2008, 10 pages.

Chen et al., "Optimizing the Use of Static Buffers for DMA on a Cell Chip", LCPC 2006, LNCS 4382, 2007, pp. 314-329.

Min et al., "Combined Compile-time and Runtime-driven, Pro-active Data Movement in Software DSM Systems", School of Electrical and Computer Engineering, Seventh Workshop on Languages, Compilers, and Run-time Support for Scalable Sytems (LCR'04), Purdue University, Oct. 2004, pp. 1-6.

Youfeng Wu, "Efficient Discovery of Regular Stride Patterns in Irregular Programs and Its Use in Compiler Prefetching", PLDI'02, ACM, Jun. 17-19, 2002, pp. 210-221.

Yang et al., "Space/Time-Efficient Scheduling and Executin of Parallel Irregular Computations", ACM Transactions on Programming Languages and Systems, vol. 20, No. 6, Nov. 1998, pp. 1195-1222.

Zhang et al., "Accelerating and Adapting Precomputation Threads for Efficient Prefetching", 13th International Symposium on High Performance Computer Architecture, IEEE, 2007, pp. 85-95.

Bernstein et al., "Context-based prefetch—an optimization for implementing objects on relations", The VLDB Journal, Springer-Verlag, 2000, 9: 177-189.

Ramachandran et al., "Architectural Mechanisms for Explicit Communication in Shared Memory Multiprocessors", Proceedings of the 1995 ACM/IEEE Supercomputing Conference, vol. 2, Dec. 3-8, 1995, pp. 1737-1775.

Vellanki et al., "A Cost-Benefit Scheme for High Performance Predictive Prefetching", SC '99, ACM, 1999, pp. 1-18.

Zucker et al., "An Automated Method for Software Controlled Cache Prefetching", Proceedings of the Thirty-First Annual Hawaii International Conference on System Sciences, vol. 7, 1998, 9 pages.

U.S. Appl. No. 12/062,559.

U.S. Appl. No. 12/062,579.

* cited by examiner

US 8,055,849 B2

REDUCING CACHE POLLUTION OF A SOFTWARE CONTROLLED CACHE

BACKGROUND OF THE INVENTION

1. Field of the Invention

The present application relates generally to an improved data processing apparatus and method and more specifically to an apparatus and method for reducing cache pollution of a software controlled cache.

2. Background of the Invention

In heterogeneous multi-core systems, reducing hardware complexity and minimizing power consumption are important design considerations. Providing each of the accelerator cores in such systems with its own fast local memory is one means of accomplishing this goal. Typically, such systems will not provide hardware supported coherence between these local memories and the global system memory. When an application (both code and data) fit within the local memory, good performance can be guaranteed. Such a feature is critical for real time applications. The Cell Broadband Engine Architecture (CBEA) is one example of such a heterogeneous multi-core system. The CBEA includes a PPE core and 8 SPE cores each with 256 KB fast local memory, as well as a globally coherent direct memory access (DMA) engine for transferring data between local memories and the shared system memory. This novel memory design, suited for generating high performance for a variety of applications, including games, graphics, etc., nonetheless requires careful programming to obtain top performance. Developing techniques to enhance the programmability of these types of architectures is currently an area of active research.

BRIEF SUMMARY OF THE INVENTION

In one illustrative embodiment, a method, in a data processing system, is provided for reducing cache pollution of a software controlled cache. The illustrative embodiments receive a request to prefetch data into the software controlled cache. The illustrative embodiments set a first designator for a first cache access to a first value. The illustrative embodiments determine if there is a second cache access to prefetch. Responsive to a determination that there is the second cache access to prefetch, the illustrative embodiments determine if data associated with the second cache access exists in the software controlled cache. Responsive to a determination that the data associated with the second cache access exists in the software controlled cache, the illustrative embodiments determine if a second value of a second designator associated with the second cache access is greater than the first value of the first cache access. Responsive to the second value failing to be greater than the first value, the illustrative embodiments swap the position of the first cache access and the second cache access in a cache line. The illustrative embodiments decrement the first value by a predetermined amount thereby forming a third value, so that the first data access has a first designator equal to the third value. The illustrative embodiments replace the second value to equal the first value, so that the second data access has a second designator equal to the first value.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
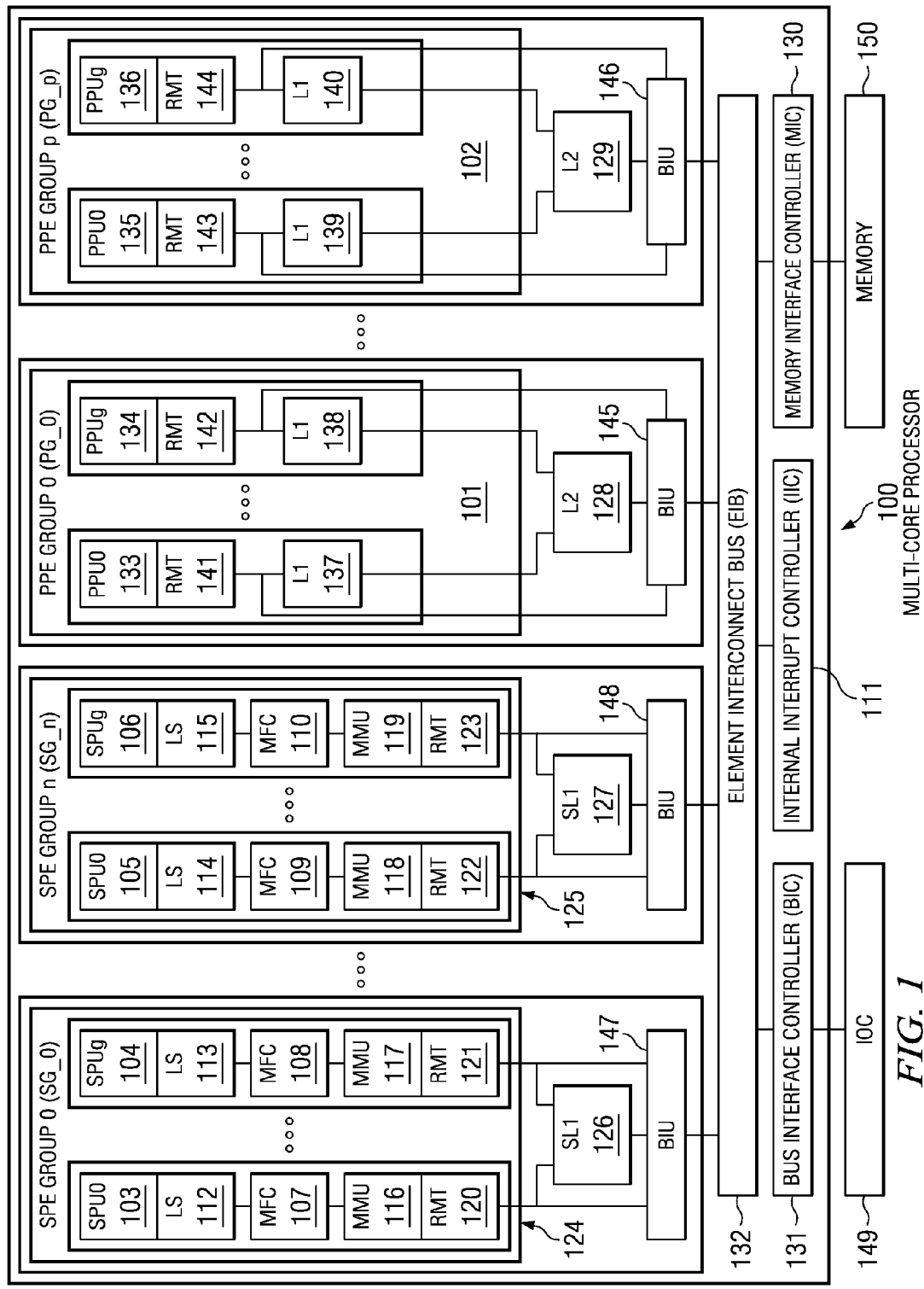
FIG. 1 depicts an exemplary diagram of a heterogeneous multi-core processor in which aspects of the illustrative embodiments may be implemented in accordance with an illustrative embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio-frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems), and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism for reducing cache pollution of a software controlled cache. Thus, the illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as exemplary environments in which exemplary aspects of the illustrative embodiments may be implemented. While the description following FIG. 1 will focus primarily on a single data processing device implementation for prefetching irregular data references for software controller caches, this is only exemplary and is not intended to state or imply any limitation with regard to the features of the present invention. To the contrary, the illustrative embodiments are intended to include distributed data processing environments and embodiments in which irregular data references are prefetched for software controller caches.

With reference now to the figures and in particular with reference to FIG. 1, exemplary diagrams of data processing environments are provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to the figures and in particular with reference to FIG. 1, an exemplary diagram of a heterogeneous multi-core processor is shown in which aspects of the illustrative embodiments may be implemented in accordance with an illustrative embodiment. This example of a heterogeneous multi-core processor is compliant with the Cell Broadband Engine™ architecture jointly developed by IBM, Sony Computer Entertainment Inc., and Toshiba. Cell Broadband Engine is a trademark of Sony Computer Entertainment Corporation. Multi-core processor 100 may consist of a single chip, a multi-chip module (or modules), or multiple single-chip modules on a motherboard or other second-level package, depending on the technology used and the cost/performance characteristics of the intended design point directed toward distributed processing targeted for media-rich applications such as game consoles, desktop systems, and servers.

Logically, multi-core processor 100 defines four separate types of functional components: Power PC® processor element (PPE) 101 or 102, synergistic processor units (SPU) 103, 104, 105, or 106, memory flow controller (MFC) 107, 108, 109, or 110, and internal interrupt controller (IIC) 111. The computational units in multi-core processor 100 are PPEs 101 and 102 and SPUs 103, 104, 105, and 106. Each of SPUs 103, 104, 105, and 106 has dedicated local storage (LS) 112, 113, 114, or 115, a dedicated MFC 107, 108, 109, or 110 with its associated memory management unit (MMU) 116, 117, 118, or 119, and replacement management table (RMT) 120, 121, 122, or 123, respectively. The combination of these components is referred to as SPU element (SPE) group 124 or 125.

Multi-core processor 100 depicts SPE groups 124 and 125 that share a single SL1 cache 126 and 127, respectively. An SL1 cache is a first-level cache for direct memory access transfers between local storage and main storage. PPE groups 101 and 102 share single second-level (L2) caches 128 and 129, respectively. While caches are shown for the SPE groups 124 and 125 and PPE groups 101 and 102, they are considered optional in the CBEA. Also included in FIG. 1 are two controllers typically found in a processor: memory interface controller (MIC) 130 and bus interface controller (BIC) 131. MIC 130 provides access to memory 150 for multi-core processor 100. BIC 131 provides an input/output interface to input/output controller (IOC) 149 for multi-core processor 100. Connecting the various units within the processor is element interconnect bus (EIB) 132. Since the requirements for the MIC 130, BIC 131, and EIB 132 vary widely between implementations, the definition for these units are beyond the scope of the CBEA.

Multi-core processor 100 may include multiple groups of Power PC® processor elements (PPE groups), such as PPE group 101 or 102, and multiple groups of synergistic processor elements (SPE groups), such as SPE group 124 or 125. Hardware resources may be shared between units within a group. However, SPE groups 124 and 125 and PPE groups 101 and 102 appears to software as independent elements.

Each of SPUs 103, 104, 105, and 106 in SPE groups 124 and 125 has its own local storage area 112, 113, 114, or 115 and dedicated MFC 107, 108, 109, or 110 that includes an associated MMU 116, 117, 118, or 119, which can hold and process memory-protection and access-permission information.

Multi-core processor 100 includes one or more of PPE group 101 or 102. PPE groups 101 and 102 consist of 64-bit Power PC® processor units (PPUs) 133, 134, 135, and 136 with associated L1 caches 137, 138, 139, and 140, respectively. Multi-core processor 100 system includes a vector multimedia extension unit (not shown) in the PPE groups 101 and 102. PPE groups 101 and 102 also contain replacement management table (RMT) 141, 142, 143, and 144 and bus interface unit (BIU) 145 and 146, respectively. BIUs 145 and 146 connect PPE groups 101 or 102 to the EIB 132. BIUs 147 and 148 connect RMTs 120, 121, 122, and 123 to EIB 132.

PPE groups 101 and 102 are general-purpose processing units, which can access system management resources, such as the memory-protection tables, for example. Hardware resources defined in the CBEA are mapped explicitly to the real address space as seen by PPE groups 101 and 102. Therefore, any PPE groups 101 and 102 may address any of these resources directly by using an appropriate effective address value. A primary function of PPE groups 101 and 102 is the management and allocation of tasks for the SPE groups 124 and 125 in a system.

Multi-core processor 100 includes one or more SPUs 103, 104, 105, or 106. SPUs 103, 104, 105, and 106 are less complex computational units than PPE groups 101 and 102, in that they do not perform any system management functions. SPUs 103, 104, 105, and 106 have a single instruction multiple data (SIMD) capability and typically process data and initiate any required data transfers, subject to access properties set up by PPE groups 101 and 102, in order to perform their allocated tasks.

The purpose of SPUs 103, 104, 105, and 106 is to enable applications that require a higher computational unit density and may effectively use the provided instruction set. A significant number of SPUs 103, 104, 105, and 106 in a system, managed by PPE group 101 or 102, allow for cost-effective processing over a wide range of applications.

MFCs 107, 108, 109, and 110 are essentially the data transfer engines. MFCs 107, 108, 109, and 110 provide the primary method for data transfer, protection, and synchronization between main storage and the local storage. MFCs 107, 108, 109, and 110 commands describe the transfer to be performed. A principal architectural objective of MFCs 107, 108, 109, and 110 is to perform these data transfer operations in as fast and as fair a manner as possible, thereby maximizing the overall throughput of multi-core processor 100.

Commands that transfer data are referred to as MFC direct memory access commands. These commands are converted into direct memory access transfers between the local storage domain and main storage domain. Each of MFCs 107, 108, 109, and 110 may typically support multiple direct memory access transfers at the same time and may maintain and process multiple MFC commands.

In order to accomplish this, MFCs 107, 108, 109, and 110 maintain and process queues of MFC commands. Each of MFCs 107, 108, 109, and 110 provides one queue for the associated SPU 103, 104, 105, or 106, MFC SPU command queue, and one queue for other processors and devices, MFC proxy command queue. Logically, a set of MFC queues is always associated with each SPU 103, 104, 105, or 106 in multi-core processor 100, but some implementations of the architecture may share a single physical MFC between multiple SPUs. In such cases, all the MFC facilities appears to software as independent for each SPU 103, 104, 105, or 106.

Each MFC direct memory access data transfer command request involves both a local storage address (LSA) and an effective address (EA). The local storage address can directly address only the local storage area of its associated SPU 103, 104, 105, or 106. The effective address has a more general application, in that it can reference main storage, including all the SPU local storage areas, if they are aliased into the real address space.

MFCs 107, 108, 109, and 110 present two types of interfaces: one to the SPUs 103, 104, 105, and 106 and another to all other processors and devices in a processing group.

SPU channel: The SPUs 103, 104, 105, and 106 use a channel interface to control MFCs 107, 108, 109, and 110. In this case, code running on SPUs 103, 104, 105, and 106 can only access the MFC SPU command queue for that SPU 103, 104, 105, or 106.

Memory-Mapped Register: Other processors and devices control MFC 107, 108, 109, and 110 by using memory-mapped registers. It is possible for any processor and device in the system to control MFCs 107, 108, 109, or 110 and to issue MFC proxy command requests on behalf of SPU 103, 104, 105, or 106.

MFCs 107, 108, 109, and 110 also support bandwidth reservation and data synchronization features.

IIC 111 manages the priority of the interrupts presented to PPE groups 101 and 102. The main purpose of IIC 111 is to allow interrupts from the other components in the processor to be handled without using the main system interrupt controller. IIC 111 is really a second level controller. IIC 111 is intended to handle all interrupts internal to a multi-core processor 100 or within a multiprocessor system of multi-core processor 100. The system interrupt controller will typically handle all interrupts external to multi-core processor 100.

In multi-core system, software checks IIC 111 to determine if the interrupt was sourced from an external system interrupt controller. IIC 111 is not intended to replace the main system interrupt controller for handling interrupts from all I/O devices.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

The illustrative embodiments provide mechanisms to prefetch irregular memory references accessed through a software data cache that is built upon hardware, such as multi-core processor 100. The illustrative embodiments may also include mechanisms for code transformation in the compiler and a runtime library component for the software data cache. The illustrative embodiments may simplify the synchronization required when prefetching into software data cache, overlap DMA operations for misses, and avoid frequent context switching to the miss handler. The illustrative embodiments may also minimize the cache pollution caused by prefetching, by looking both forward and backward through the sequence of addresses to be prefetched.

Figure 2:
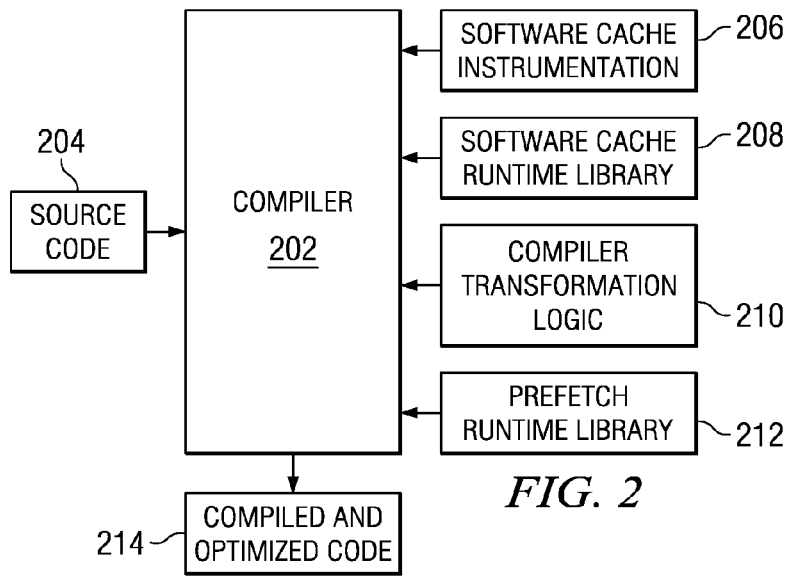
FIG. 2 depicts an exemplary operation of a compiler that compiles data used by an application in accordance with an illustrative embodiment.

FIG. 2 depicts an exemplary operation of a compiler that compiles data used by an application in accordance with an illustrative embodiment. A compiler is a computer program that translates a series of statements written for one application program in one computer language, commonly called source code, into a resulting output in another computer language, commonly called the object or target code.

To ease the programming for the Cell broadband engine architecture (CBEA), a single source compiler, such as compiler 202, abstracts the complexity of an underlying memory hierarchy and presents a programmer with a single shared memory image. Compiler 202 receives conventional source code 204 and generates compiled and optimized code 214 to be executed on either the Power PC® processor unit (PPU) or the synergistic processor units (SPUs). Using compiler 202, the programmer may program using a traditional shared memory programming model, yet still exploit the local memories for efficiency and performance. Compiler 202 is responsible for managing data transfers transparently, while still ensuring correctness and performance.

The thread of code running on a synergistic processor unit (SPU) of a SPU element (SPE) may access its local memory directly or transfer data from main memory to its local memory using direct memory access (DMA) operations. Compiler 202 provides mechanisms to automatically manage those DMA and local memory operations. Software data cache instrumentation 206 is the basic mechanism for data management in compiler 202. Software data cache instrumentation 206 works in a way similar to hardware data cache instrumentation, but the data cache is implemented in software. The software data cache for the SPU may be, for example, a four-way associative cache with a cache block size of 128 B and 512 blocks, giving a total size of 64 KB. There is a cache directory recording meta-data for the software data cache. The cache directory contains three major pieces of information for a cache block: cache tag, data pointer, and dirty bits. The cache tag records the system memory address for the data in the cache block, as in a hardware cache. The data pointer contains a pointer to a 128 B local store space, recording where the cache block is in the local store. Dirty bits for a cache block record which bytes in the cache block have been modified by this thread. Since there is no hardware cache coherence, dirty bits are mandatory for proper coherence maintenance in a multi-threading environment. The cache directory can be further extended to include other information such as special flags to lock a cache block.

Compiler 202 replaces loads and stores to system memory in the synergistic processor element (SPE) code with instructions that explicitly look up the system memory address in the cache directory of the software data cache. If a cache block for the system memory address is found in the cache directory (which means a cache hit), the value in the cache block is used. Otherwise, if a cache block for the system memory address is not found in the directory, compiler 202 handles the missing cache block as a cache miss. For a cache miss, a miss handler function is invoked to retrieve the data from main memory. The miss handler may allocate space for the incoming cache block. If there is an unused cache block in a cache set, which is a group of cache lines or cache blocks, the miss handler simply uses the unused cache block. If not, the miss handler selects and evicts a cache block. If every bit has been modified in the cache block to be evicted, then the miss handler uses a DMA put operation to perform the eviction. Otherwise, an atomic update operation supported by the SPE DMA engine is used. After the miss handler has evicted the cache block, the miss handler issues a DMA get to bring in data for the miss. The miss handler simulates a FIFO replacement policy by rotating the cache blocks in a cache set.

However, using software data cache is expensive and incurs significant runtime overhead due to the cost of cache lookups and miss handling. Some data references may be regular references from the point-of-view of compiler 202 optimizations. These regular references occur within a loop and the memory addresses that the regular references refer to may be expressed using affine expressions of loop induction variables. For such regular data accesses to shared data, the use of the software data cache may be avoided by applying a direct buffering optimization instead. Direct buffering allocates temporary buffers for regularly accessed data in the SPE local store. For read references, direct buffering initializes the buffer with a DMA get operation before the loop executes. For write references, direct buffering writes out the data from the buffer using a DMA put operation after the loop finishes execution. Compiler 202 statically generates these DMA get and DMA put operations. Compiler 202 also transforms the loop body so that the SPE computation code directly accesses the local buffer without incurring any software data cache overhead. Furthermore, DMA operations can be overlapped with computation by using multiple buffers. Compiler 202 may choose the proper buffering scheme and buffer size to optimize execution time and space.

However, irregular memory reference patterns may be a problem for both direct buffering and the software data cache. The subscripted index array is a common example. If the values of the index array, namely the subscript, scatter without much locality, the values will result in a high miss rate. Such cache misses with irregular memory reference patterns are a problem for traditional hardware caches. This problem is even worse for a software data cache due to:

Overhead of blocked DMA operations. The program has to wait for the DMA transfer to finish before proceeding. This is similar to stalls for cache misses in an in-order machine.

Overhead of frequent jumps to the miss handler function. Each cache miss is served by a miss handler function, which incurs an overhead for context switching.

Prefetching is a technique that may be used to reduce the overhead of cache misses. Prefetching is applied to data accesses that are likely to exhibit a high miss rate, and prefetching works by issuing ahead-of-time cache requests for data that is expected to be accessed some distance further along in the computation. Prefetching enables overlapping cache miss latency with ongoing computation, thus reducing the amount of execution time wasted stalling for data transfers in the memory hierarchy. Prefetching may be issued by hardware or software, but hardware prefetching generally targets only regular or patterned data accesses, while the illustrative embodiments target irregular data accesses. The illustrative embodiments target prefetching for software controlled cache, which is not visible to hardware. The illustrative embodiments use software prefetching, but unlike traditional software prefetching techniques, the illustrative embodiments aggregate a number of prefetch requests across multiple loop iterations and issue all of the prefetch requests together. This design is important considering that, instead of using hardware support for caching or speculation, the illustrative embodiments use a software data cache and software-directed DMA commands for all data transfers.

Traditional software prefetching uses special prefetch commands provided by the hardware cache and may use a separate thread to issue prefetch requests. In the Cell SPE, the context switching overhead for multiple threads may be very high, so the illustrative embodiments transform code to introduce DMA transfers for prefetching earlier on within the same instruction sequence. Since DMA transfers are software directed, all synchronization for completion of data transfers and data availability has to be handled in software, and the overhead for doing this may be high relative to using hardware cache prefetch mechanisms. Furthermore, lack of support for speculative execution requires that the prefetch requests are issued for valid memory addresses. This precludes prefetch optimizations that speculate on the addresses to prefetch data from.

In order to provide a mechanism to prefetch irregular memory references, the illustrative embodiments provide compiler transformation logic 210 and prefetch runtime library 212. Compiler transformation logic 210 splits a loop containing an irregular memory reference into two loops. The first loop, called the address collecting loop, collects the addresses of all data accessed by the irregular memory reference. This loop gathers exactly those addresses used in the original loop, since the illustrative embodiments do not use speculation when issuing DMA commands for prefetching. The second loop, called the computation loop, performs the computation in the original loop. Between these two loops, compiler 202 inserts a call to runtime library 208 to try and prefetch all the addresses collected. As a result, most cache misses that may have occurred in the original loop will be handled in the runtime prefetching call, and the irregular memory reference in the computation loop may incur less overhead from jumping to the miss handler routine. Using a single runtime call to handle prefetching for multiple irregular memory references allows for an overlap of DMA operation. In addition, using a single runtime also simplifies synchronization for multiple DMA operations since the prefetched values will not be needed until the second computation loop begins execution.

Since a loop may contain more than one irregular memory reference, if the addresses accessed by these irregular memory references do not depend on each other, the illustrative embodiments may collect addresses for multiple irregular memory references in a single address collecting loop. However, if the irregular memory references do depend on each other, multiple levels of prefetching will need to be generated. For example, for expressions, such as a[b[ind[i]]], or *(*(p+i)+k) where p is a two-level pointer, multiple levels of prefetching may be required. In this case, the computation loop of the $n^{th}$ level and the address collection loop of the $(n+1)^{th}$ level may be merged.

It is important to notice that in the illustrative embodiments, one runtime call for prefetching may prefetch data for a number of loop iterations, not just a single reference. The prefetching range may be the number of iterations to prefetch data for one runtime prefetching call. The prefetching range for a loop does not have to be the same as the block factor for direct buffering. Loops may be further blocked to allow for a smaller prefetching range. However, the prefetching range may not be larger than the block factor for direct buffering because the size of the index array used for collecting prefetch addresses is limited by the block factor used in direct buffering. When the prefetching range is determined at compile time, the prefetching range may be called static prefetching range. However, the loop can also be transformed in a way such that the prefetching range is controlled dynamically at runtime.

To apply a software prefetching technique at compile time, the memory accesses in the source code that are suitable targets need to be identified, i.e. memory accesses that are irregular memory references and that suffer from high miss rates. In order to perform the identification of the suitable targets, compiler 202 may use pattern matching, profiling, or the like.

To determine which irregular memory references to prefetch in a source code, compiler 202 analyzes all of the memory references within the innermost normalized loops, i.e. loops that are suitable targets for direct buffering optimization. If the address accessed by a memory reference is not computed as an affine function of the loop index variable and there are no loop-carried dependencies between statements used in the address computation, then compiler 202 identifies that memory reference as a candidate for optimization. Prefetching optimization may be applied to loops where all memory accesses are covered either by direct buffering or by the prefetching optimization or to loops containing residual memory references that are accessed through the default software data cache mechanism.

Once compiler 202 has identified a loop containing irregular memory references to target, compiler transformation logic 210 transforms the code for this loop to determine if the candidate is valid for prefetching. In order to determine if the irregular memory reference is valid for prefetching, compiler transformation logic 210 back-slices the address part of an irregular memory reference, follows the data dependence and control dependence edges backward to include all of the computation needed for the address of the irregular memory reference, and ends at the entrance of the loop. If the back-sliced address contains a cache reference, then compiler transformation logic 210 determines the candidate to be invalid for prefetching.

If the back-sliced address does not contain a cache reference, then compiler transformation logic 210 determines the candidate to be valid for prefetching and inserts a store statement for the address of the irregular memory reference into the loop. This statement records addresses accessed by the irregular memory reference across all loop iterations, writing them into a temporary array, addr buf. The loop iteration variable may be used to index addr buf and determine the element of addr buf that contains the address of the irregular memory reference in the corresponding loop iteration. Compiler transformation logic 210 then distributes the loop into an address collection loop and a computation loop. The address collection loop comprises all statements that contribute to computing the address of the irregular memory references. The computation loop is a copy of the original loop. It is possible to optimize the computation loop by applying a transformation analogous to common subexpression elimination and removing redundant computation statements common to both loops. Once compiler transformation logic 210 distributes the loop into an address collection loop and a computation loop, compiler 202 inserts runtime library calls into prefetch runtime library 212 for prefetching between the address collection loop and the computation loop.

To prefetch data for data accesses due to one irregular memory reference in the loop, the runtime code should know the address array and the size of data to prefetch for addresses recorded in this array. To prefetch data for more than one irregular memory reference in the loop, compiler transformation logic 210 defines two library functions, pf register and pf do.

pf register(char *addr bu, int data size)
pf do(int iter num)

pf register is used to record information needed to prefetch data for a single irregular memory reference. pf do is used to actually perform prefetching. Compiler transformation logic 210 inserts a call to pf register for each irregular memory reference in the loop, followed by a single call to pf do.

Each pf register call simply saves all its parameters into an array of structures used to record this information for the subsequent pf do call. When compiler 202 invokes pf do, the pf do executes a loop that iterates over the prefetching range. For each iteration, compiler 202 checks all registered reference addresses to see if data corresponding to the address already exists in the software data cache. If the data is not in software data cache yet, compiler 202 performs prefetching. In pf do, requests to prefetch multiple references are interleaved without bias for any reference. Also, for addresses corresponding to a single reference, the order of prefetching follows the order in which data is used in iterations of the computation loop.

In order to dynamically control the prefetching range at runtime, the prefetching range should be large so that more DMA operations may be overlapped, there is a longer address sequence for replacement optimization, and there is better amortization of the prefetching call overhead over a large number of iterations. However, the prefetching range cannot be too large. That is, if the prefetching range and hence the number of prefetches increase, some data references may not be prefetched due to associativity conflicts. The failure to prefetch data references may result in expensive cache misses in the computation loop. Thus, the illustrative embodiments use a dynamic prefetching range to adapt the above described prefetching embodiment to the runtime behavior of programs.

In this illustrative embodiment, prefetch runtime library 212 dynamically determines which prefetching range to use. Prefetch runtime library 212 decides when to stop issuing DMA commands for prefetching and move on to executing the next set of iterations of the computation loop. In order to perform these steps, the interface for the previous described pf do within the temporary array is accordingly changed to a new interface, called pf do dynamic:

int pf do dynamic(int pf lb, int pf ub)

The call to pf do dynamic tries to prefetch from lower bound pf lb up to upper bound pf ub, which may be referred to as upper limit of trip counts, but may stop early depending on certain runtime conditions. The function returns the iteration value at which it stopped prefetching. Prefetch runtime library 212 uses the returned value as the pf lb value in the next call to pf do dynamic so that prefetching may continue from that iteration. Also, compiler transformation logic 210 transforms the code for the computation loop to enclose the computation loop within a new do-while loop that also includes a call to pf do dynamic in each iteration. The lower bound and upper bound of the computation loop are now determined by prior calls to pf do dynamic.

Various rules may be designed for the stopping condition in calls to pf do dynamic. For example, compiler 202 may monitor how many cache blocks have been prefetched, how the execution time changes with the change in range in previous invocations, stopping prefetching when a first associativity conflict occurs, or the like. For example, to stop prefetching when the first associativity conflict occurs, i.e. in an N-way associative cache stop when prefetching requires the $(n+1)^{th}$ block in a set. The call to this rule may be called a no-conflict rule. The no-conflict rule may be efficiently implemented with a look-back policy that will be described below. The no-conflict rule minimizes the references skipped by prefetching and allows further optimization in the program, as will be discussed in the following section.

The result of transforming the code for prefetching results in two cache lookups for each prefetched reference: one lookup in the prefetching function and one in the computation loop. In order to avoid a lookup in the computation loop, a no-conflict rule for dynamic range may be used. For each prefetched reference, if the local store address of its cache block with proper offset is recorded in an array of pointers, compiler 202 may replace the references in the computation loop with a direct reference from this array of pointers. To apply this transformation for eliminating lookups in the computation loop, compiler 202 always prefetches the corresponding reference into the software data cache by the runtime and prevents the prefetched data from being evicted from the software data cache before its use in the computation loop. The no-conflict rule guarantees that compiler 202 prefetches every reference in the following computation loop when the maximum number of cache blocks used in one loop iteration is no more than the cache associativity. To prevent premature eviction of prefetched cache blocks from the cache, compiler transformation logic 210 ensures that there are no other references through software data cache in the computation loop, i.e. all references are either through direct buffers or are optimized via the above described prefetching scheme. Another method to prevent premature eviction of prefetched cache blocks, requires that compiler 202 lock the prefetched cache blocks in cache, taking care to leave at least one cache block in each set unlocked and available for replacement.

For eliminating cache lookups, in addition to the change in the runtime library, compiler 202 may transform the code in two ways:

Add two new parameters for pf register. An array of pointers, called cache buf, and a write flag are added. The array of pointers (cache buf) is used to record the local store addresses of the prefetched data. The write flag tells the runtime library to set the dirty bits if the reference is a write. This is necessary because in the illustrative embodiments, the dirty bits modification is ordinarily coupled with the cache lookup, which is now eliminated.

Remove the cache lookup for the prefetched reference in the computation loop, and replace it with a direct reference using the corresponding cache block pointer from cache buf.

One drawback to prefetching may be that prefetching may pollute the cache if the prefetched cache blocks cause some useful data to be evicted. However, in the illustrative embodiments, there is no speculation and all prefetched data is useful. That is, no unnecessary cache blocks of data are prefetched into the cache. However, by prefetching many data references all at once and consuming the data references later, the likelihood that pollution will occur is increased. For ordinary cache accesses, the software data cache simulates the first-in first-out (FIFO) policy by rotating the cache blocks in a set whenever a cache miss is serviced. Thus, the illustrative embodiments provide for reducing cache pollution when used in conjunction with the above described illustrative embodiments.

In general, an optimal replacement policy is for software cache runtime library 208 to replace the cache block of data that will be used farthest in the future. However, to implement such a policy, the compiler needs to know about future data references. Fortunately, software cache runtime library 208 knows the sequence of addresses to be prefetched within the prefetching range when pf do is called, which provides at least partial knowledge of future data references for optimization. In many cases, most other references in the loop are optimized by direct buffering and, as a result, the major impact of pollution is primarily on prefetched data itself. Thus, cache pollution may be minimized if software cache runtime library 208 uses smart cache placement when prefetching.

Since numerous data references may be prefetched together without immediately using any of them, the illustrative embodiment recognizes that replacing a cache block that has just been prefetched is undesirable. If that cache block is replaced, the replaced cache block may cause a miss in the computation loop, which may replace another prefetched cache block that has not been used as yet. Thus, the illustrative embodiments propose a look-ahead policy to determine which cache blocks will be used, and a look-back policy to determine which cache blocks have just been prefetched.

Figure 3:
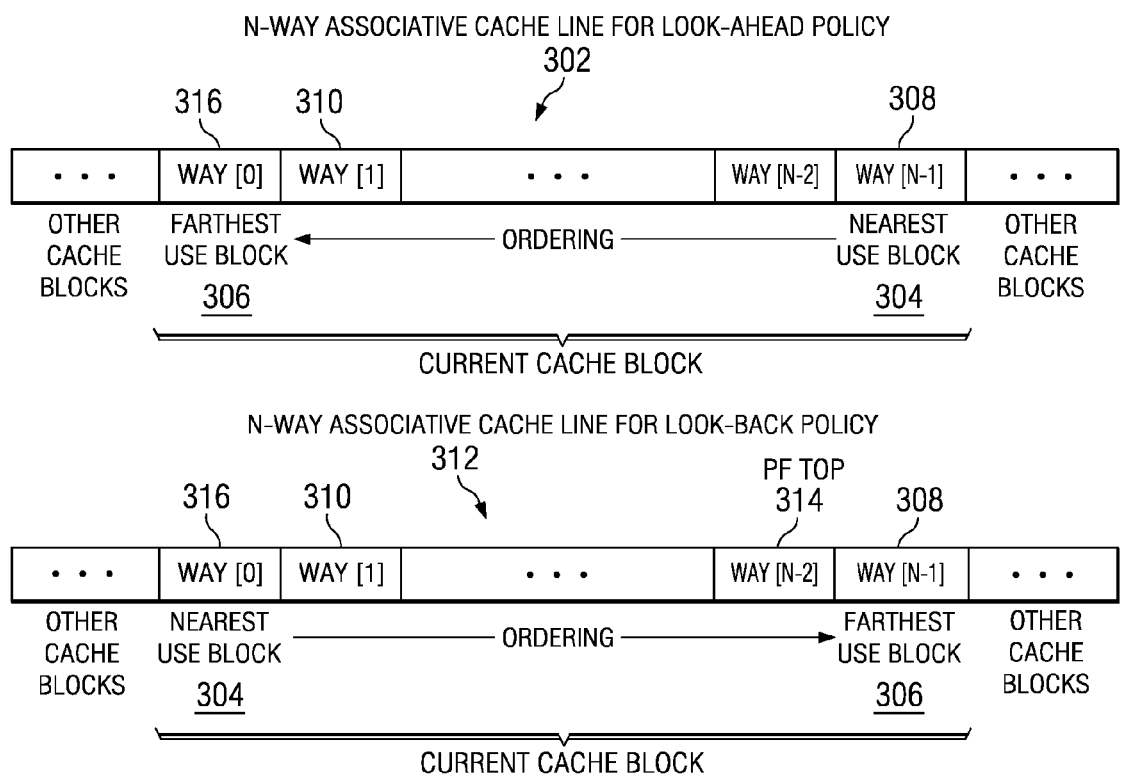
FIG. 3 illustrates an N-way associative cache line for a look-ahead policy and a look-back policy in accordance with an illustrative embodiment.

FIG. 3 illustrates an N-way associative cache line for a look-ahead policy and a look-back policy in accordance with an illustrative embodiment. An N-way associative cache is a cache that is broken into sets where each set contains "N" cache lines. Then, a memory address is assigned a set and can be cached in any one of those locations within the set to which it is assigned. In other words, within each set the cache is associative, and thus the name N-way associative cache. In an N-way associative cache there are "N" possible places that a given memory location may be in the cache. The tradeoff is that there are "N" times as many memory locations competing for the same "N" lines in the set. For example, if the software cache is a 4-way associative cache, instead of a single cache block of 16,384 lines, there are 4,096 sets with 4 lines in each. Each of these sets is shared by 16,384 memory addresses (64 M divided by 4 K) instead of 4,096 addresses as in the case of the direct mapped cache. So there is more to share (4 lines instead of 1) but more addresses sharing it (16,384 instead of 4,096).

Within the N-way associative cache line, it is expensive to check which cache block is the farthest reference each time a cache block is to be replaced. Instead, the illustrative embodiments approximate this look-ahead policy with one scan of the addresses collected within the prefetching range. Before any prefetch requests are issued, software cache runtime library 208 in FIG. 2 looks up all the addresses to prefetch in the cache. In look-ahead policy 302, software cache runtime library 208 sorts the hit cache blocks, namely those that are to be used in the computation loop, in the set as follows: for an N-way cache line, the cache blocks from nearest-use cache block 304 to farthest-use cache block 306 are placed from way [N−1] 308 to way[1] 310.

To further detail this operation, for each loop in the program, software cache runtime library 208 sets the designation of the first encountered cache access to farthest or way [N−1]. Then software cache runtime library 208 determines if there is another cache access in the loop. If there is not another cache access in the loop then the cache line contains only one cache access. However, if software cache runtime library 208 determines that there is another cache access in the loop, software cache runtime library 208 looks up the address of the next cache access. If software cache runtime library 208 determines that the address is a not cache hit, then software cache runtime library 208 determines if there is another cache access in the loop. If software cache runtime library 208 determines that there is a cache hit, software cache runtime library 208 determines if way of the cache hit is greater than the way [N−1] previously set. If the way is greater than way [N−1], then software cache runtime library 208 adds the way to the cache line in order and software cache runtime library 208 determines if there is another cache access in the loop. If the way is less than way [N−1], then the cache blocks are swapped where the way becomes way [N−1] and the previous way [N−1] is decremented by one to become way [N−2]. Then software cache runtime library 208 determines if there is another cache access in the loop.

To track which cache blocks have been prefetched using look-back policy 312, the compiler allocates an integer variable, called pf top 314, for each cache set and initializes the integer variable to zero. Look-back policy 312 maintains that if pf top 314 equals to N, the ways from way [1] 310 to way [N−1] 308 are cache blocks that are either a hit cache block or a cache block brought into the cache in the last prefetching call. To further detail this operation, for each loop in the program, software cache runtime library 208 sets pf top equal to zero. Then software cache runtime library 208 determines if there is another cache access in the loop. If there is not another cache access in the loop then the cache line contains only one cache access. However, if software cache runtime library 208 determines that there is another cache access in the loop, software cache runtime library 208 looks up the address of the next cache access. If software cache runtime library 208 determines that the address is not a cache hit, then software cache runtime library 208 determines if pf top of the cache line is equal to N. If pf top is equal to N then software cache runtime library 208 determines if there is another cache access in the loop. If pf top is not equal to N then software cache runtime library 208 evicts way [pf top] if the cache line has been modified, prefetches the cache access into way [pf top], and increments pf top by one. Once these steps are done, software cache runtime library 208 determines if there is another cache access in the loop.

If software cache runtime library 208 determines that there is a cache hit, software cache runtime library 208 determines if way of the cache hit is less than the way [pf top] of the cache line. If the way is less than way [pf top], then software cache runtime library 208 adds the way to the cache line in order and software cache runtime library 208 determines if there is another cache access in the loop. If the way is greater than way [pf top], then the cache blocks are swapped where the way becomes way [N−1] and the previous way [pf top] is incremented by one. Then software cache runtime library 208 determines if there is another cache access in the loop.

When another cache block needs to be prefetched into a set with pf top equal to N, prefetching such a cache block may result in an associativity conflict. In such cases, no cache block in the set may be replaced and the compiler skips prefetching of the reference, because all ways are occupied and needed in previous iterations. The skipped prefetches will result in cache misses in the computation loop. When using the default look-back policy, these cache misses are serviced by always evicting way [0] 316 of the corresponding set. The placement algorithm that uses both a look-ahead policy and a look-back policy is optimal when all cache accesses in the computation loop are those that have been subject to prefetching optimization.

While the look-ahead policy does not overlap with DMA operations, the look-back policy may be overlapped with DMA operations, and it is also necessary for detecting associativity conflicts when using a dynamic prefetching range. While the look-back policy may be used separately from the look-ahead policy, a drawback of using just the look-back policy may be that way [0] 316 is repeatedly evicted. One solution may be to change the original algorithm for the look-back policy so that software cache runtime library 208 always evicts way [N−1] 30l, and then either rotate the ways from pf top to N, which may be referred to as a "look-back+ rotate policy," or directly swap way [N−1] 308 and way [pf top], which may be referred to as a "look-back+swap policy."

Thus, mechanisms are provided to prefetch irregular memory references accessed through a software data cache that is built upon hardware. The mechanisms simplify the synchronization required when prefetching into software data cache, overlap DMA operations for misses, and avoid frequent context switching to the miss handler. These mechanisms also minimize the cache pollution caused by prefetching.

Figure 4:
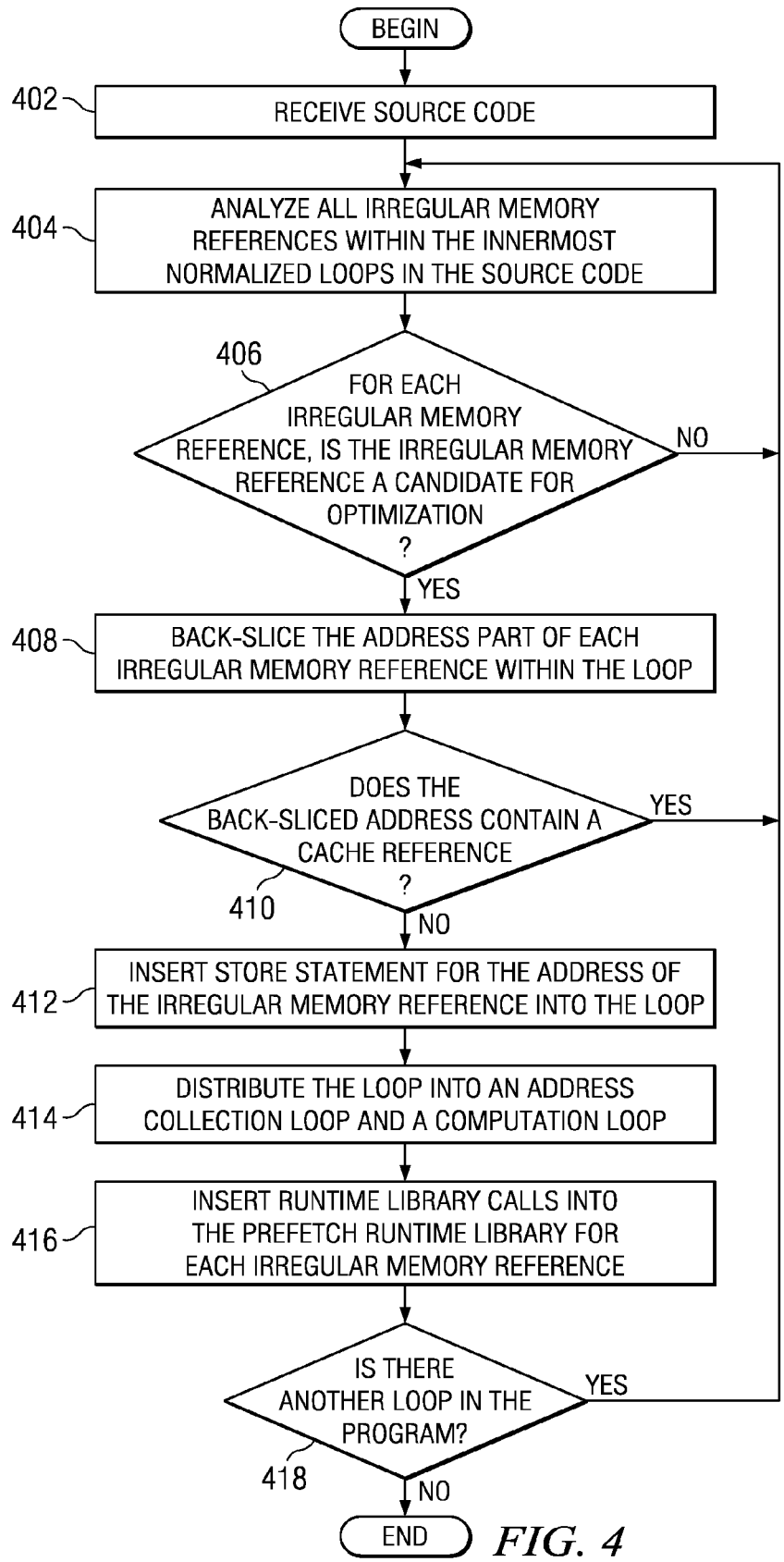
FIG. 4 is an exemplary flow diagram of an operation for initializing the prefetching of irregular memory references in source code in accordance with one illustrative embodiment.

FIG. 4 is an exemplary flow diagram of an operation for initializing the prefetching of irregular memory references in source code in accordance with one illustrative embodiment. As the operation begins, source code is received by a compiler (step 402). The compiler analyzes all of the memory references within the innermost normalized loops of the source code (step 404). For each irregular memory reference in the innermost normalized loops, the compiler determines if the irregular memory reference is a candidate for optimization (step 406). In one embodiment, the compiler identifies a candidate for optimization by confirming that the address accessed by the irregular memory reference is not computed as an affine function of the loop index variable and that there are no loop-carried dependencies between statements used in the address computation.

If at step 406 the compiler determines that the irregular memory reference is not a candidate for optimization, then the operation returns to step 404. If at step 406 the compiler determines that the irregular memory reference is a candidate for optimization, then compiler transformation logic transforms the code for a loop that contains the irregular memory reference to determine if the candidate is valid for prefetching. In order to determine if the candidate is valid for prefetching, the compiler transformation logic back-slices the address part of each irregular memory reference within the loop (step 408). In back-slicing the address part of an irregular memory reference, the compiler transformation logic follows the data dependence and control dependence edges backward to include all of the computations needed for the address of the irregular memory reference, which ends at the entrance of the loop. Then the compiler transformation logic determines if the back-sliced address contains a cache reference (step 410). If at step 410 the compiler transformation logic determines that the back-sliced address contains a cache reference, then the candidate is invalid for prefetching and the operation returns to step 404.

If at step 410 the compiler transformation logic determines that the back-sliced address fails to contain a cache reference, then the compiler transformation logic determines the candidate to be valid for prefetching. The compiler transformation logic then inserts a store statement for the address of the irregular memory reference into the loop (step 412). This store statement records addresses accessed by the irregular memory reference across all loop iterations, writing them into a temporary array, addr buf. The loop iteration variable may be used to index addr buf and determine the element of addr buf that contains the address of the irregular memory access in the corresponding loop iteration. Once the compiler transformation logic inserts the store statement into the loop, the compiler transformation logic distributes the loop into an address collection loop and a computation loop (step 414). The compiler inserts prefetch runtime library calls into a prefetch library for prefetching between the address collection loop and the computation loop (step 416). Then the compiler determines if there is another loop to analyze (step 418). If at step 418 the compiler determines there is another loop to analyze, the operation returns to step 404. If at step 418 there is not another loop to analyze, then the operation ends.

Figure 5:
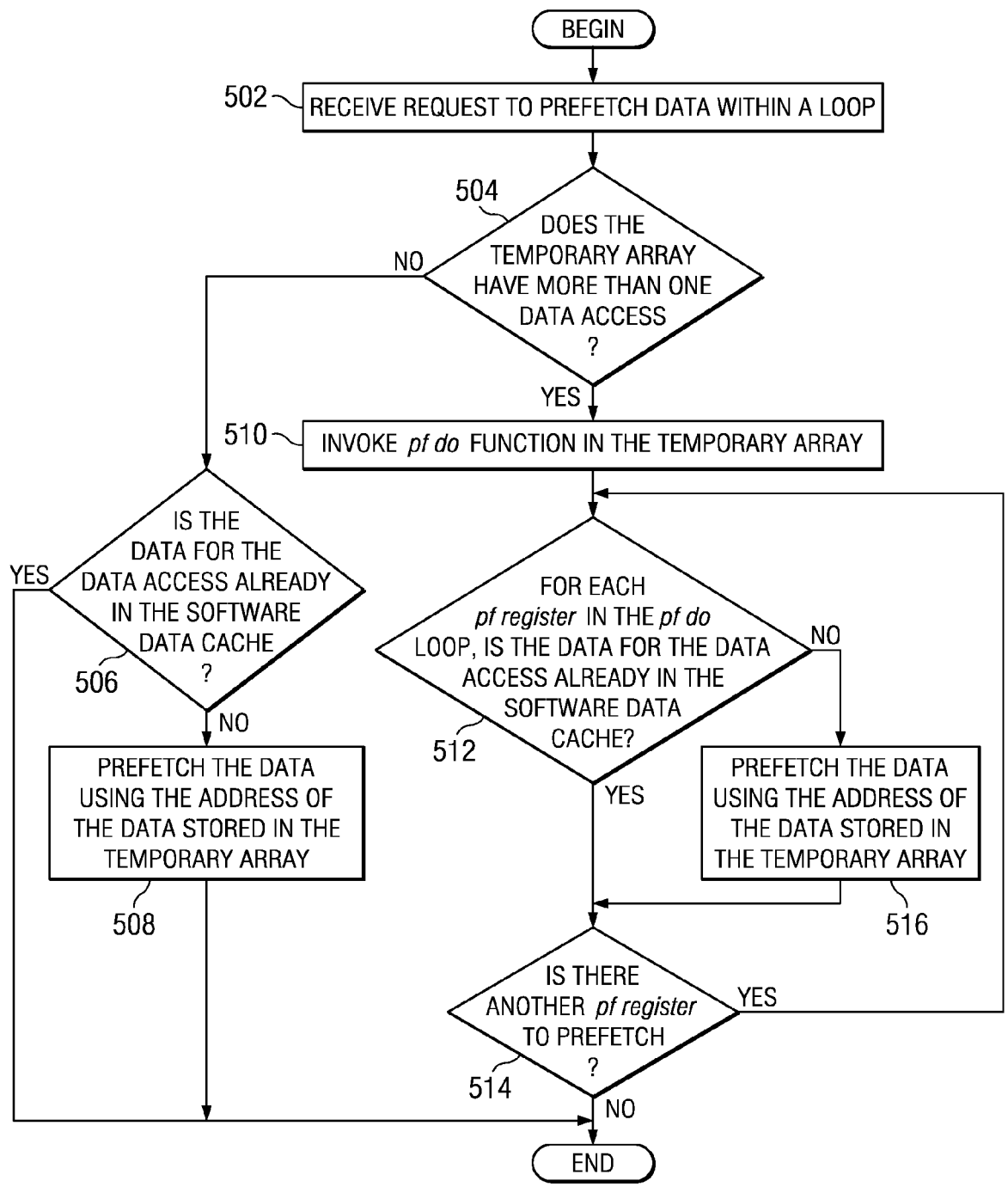
FIG. 5 is an exemplary flow diagram of an operation for prefetching irregular memory references in source code in accordance with one illustrative embodiment.

FIG. 5 is an exemplary flow diagram of an operation for prefetching irregular memory references in source code in accordance with one illustrative embodiment. As the operation begins, the compiler receives a request to prefetch data within a loop (step 502). In order to prefetch the data for the loop, the compiler checks the temporary array, addr buf, to determine if the temporary array has more than one data access to be prefetched (step 504). If at step 504 the temporary array includes only one irregular memory reference to be prefetched, the compiler checks to see if data corresponding to the address of the data access already exists in the software data cache (step 506). If at step 506 the data is already in the software data cache, then the operation ends. If at step 506 the data is not already in the software data cache, the compiler uses the address array and the size of data recorded in the temporary array to prefetch the irregular memory reference (step 508), with the operation ending thereafter.

If at step 504 the temporary array includes more than one irregular memory reference in the loop, the compiler invokes pf do function inserted in the temporary array by the compiler transformation logic (step 510). The pf do executes a loop that iterates over the prefetching range of the pf register calls that are inserted for each irregular memory reference in the loop. For each pf register call the compiler checks all registered reference addresses to see if data corresponding to the address already exists in the software data cache (step 512). If at step 512 the data is already in the software data cache, the compiler determines if there is another pf register call in the pf do loop (step 514). If at step 514 there is another pf register call in the pf do loop, then the operation returns to step 512. If at step 514 there is not another pf register call in the pf do loop, the operation ends. If at step 512 the data is not in software data cache yet, the compiler uses the address array and the size of data recorded in the temporary array to prefetch the irregular memory reference (step 516), with the operation proceeding to step 514 thereafter.

Figure 6:
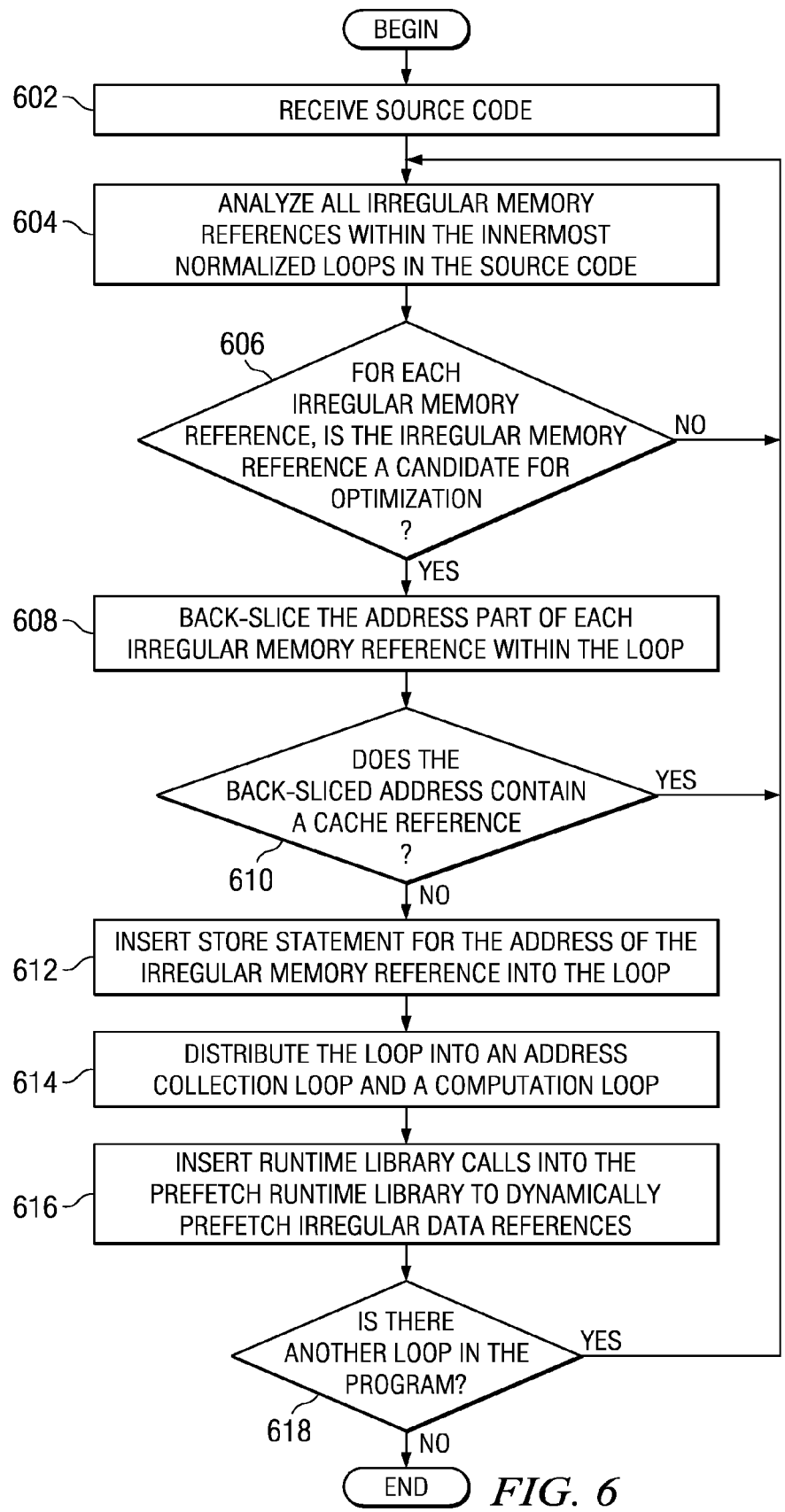
FIG. 6 is an exemplary flow diagram of an operation for initializing the dynamic prefetching of irregular memory references in source code in accordance with one illustrative embodiment.

FIG. 6 is an exemplary flow diagram of an operation for initializing the dynamic prefetching of irregular memory references in source code in accordance with one illustrative embodiment. As the operation begins, source code is received by a compiler (step 602). The compiler analyzes all of the memory references within the innermost normalized loops of the source code (step 604). For each irregular memory reference in the innermost normalized loop, the compiler determines if the irregular memory reference is a candidate for optimization (step 606). In one embodiment, the compiler identifies a candidate for optimization by confirming that the address accessed by the irregular memory reference is not computed as an affine function of the loop index variable and that there are no loop-carried dependencies between statements used in the address computation.

If at step 606 the compiler determines that the irregular memory reference is not a candidate for optimization then the operation returns to step 604. If at step 606 the compiler determines that the irregular memory reference is a candidate for prefetching, then compiler transformation logic transforms the code for a loop that contains the irregular memory reference to determine if the candidate is valid for prefetching. In order to determine if the candidate is valid for prefetching, the compiler transformation logic back-slices the address part of each irregular memory reference (step 608). In back-slicing the address part of an irregular memory reference, the compiler transformation logic follows the data dependence and control dependence edges backward to include all of the computations needed for the address of the irregular memory reference, which ends at the entrance of the loop. Then the compiler transformation logic determines if the back-sliced address contains a cache reference (step 610). If at step 610 the compiler transformation logic determines that the back-sliced address contains a cache reference, then the candidate is invalid for prefetching and the operation returns to step 604.

If at step 610 the compiler transformation logic determines that the back-sliced address fails to contain a cache reference, then the compiler transformation logic determines the candidate to be valid for prefetching. The compiler transformation logic then inserts a store statement for the address of the irregular memory reference into the loop (step 612). This store statement records addresses accessed by the irregular memory reference across all loop iterations, writing them into a temporary array, addr buf. The loop iteration variable may be used to index addr buf and determine the element of addr buf that contains the address of the irregular access in the corresponding loop iteration. Once the compiler transformation logic inserts the store statement into the loop, the compiler transformation logic distributes the loop into an address collection loop and a computation loop (step 614). The compiler inserts runtime library calls into a prefetch runtime library to dynamically prefetch irregular data references (step 616). Then the compiler determines if there is another loop to analyze (step 618). If at step 618 the compiler determines there is another loop to analyze, the operation returns to step 604. If at step 618 there is not another loop to analyze, then the operation ends.

Figure 7:
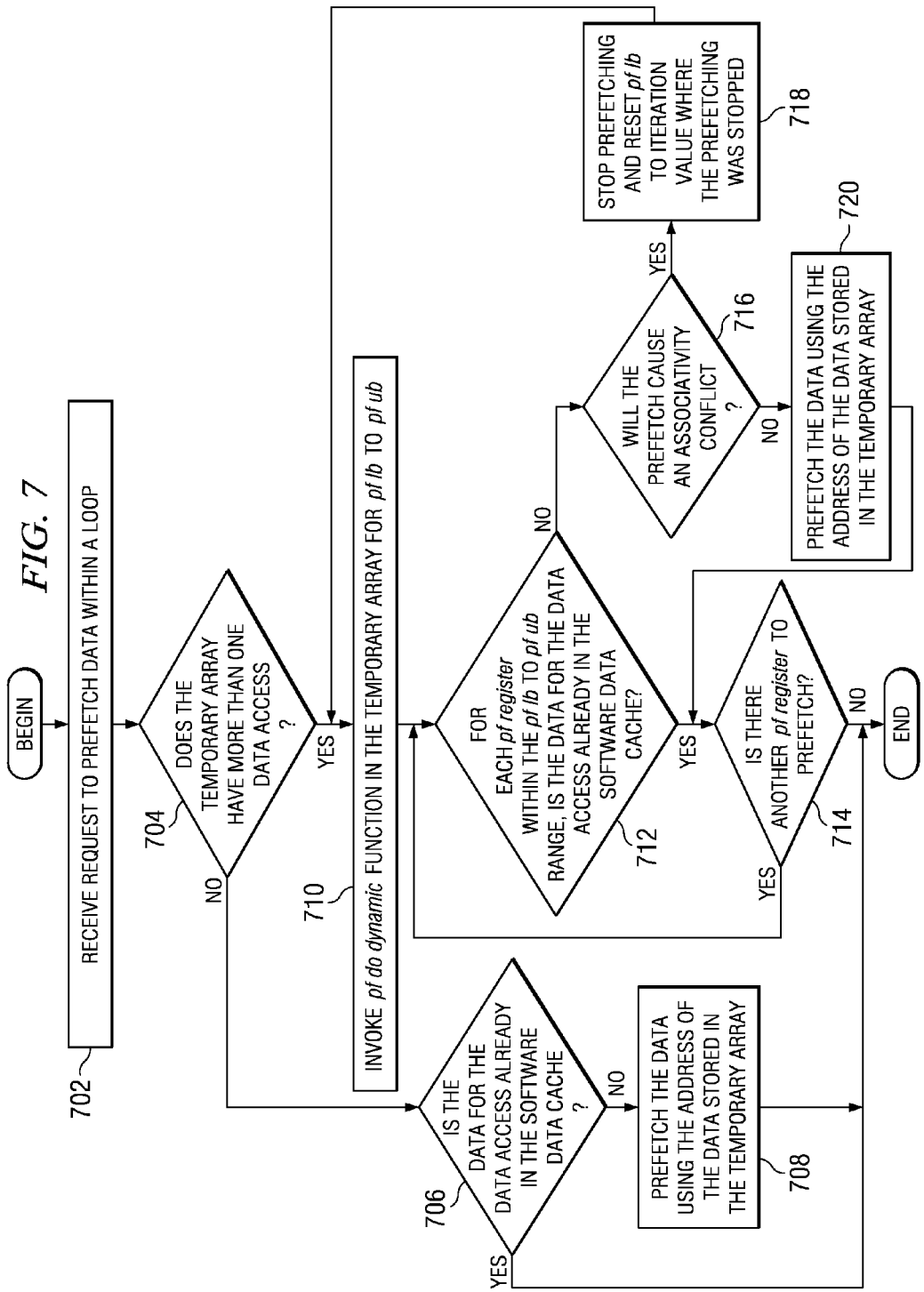
FIG. 7 is an exemplary flow diagram of an operation for prefetching irregular memory references in source code in accordance with one illustrative embodiment.

FIG. 7 is an exemplary flow diagram of an operation for dynamically prefetching irregular memory references in source code in accordance with one illustrative embodiment. As the operation begins, the compiler receives a request to prefetch data within a loop (step 702). In order to prefetch the data for the loop, the compiler checks the temporary array, addr buf to determine if the temporary array has more than one data access to be prefetched (step 704). If at step 704 the temporary array includes only one irregular memory reference to be prefetched, the compiler checks to see if data corresponding to the address of the data access already exists in the software data cache (step 706). If at step 706 the data is already in the software data cache, then the operation ends. If at step 706 the data is not already in the software data cache, the compiler uses the address array and the size of data recorded in the temporary array to prefetch the irregular memory reference (step 708), with the operation ending thereafter.

If at step 704 the temporary array includes more than one irregular memory reference in the loop, the compiler invokes pf do dynamic function inserted in the temporary array by the compiler transformation logic over the pf lb to pf ub range (step 710). The pf do dynamic executes a loop that iterates over the pf lb to pf ub range of the pf register calls that are inserted for each irregular memory reference in the loop. For each pf register call within the pf lb to pf ub range, the compiler checks all registered reference addresses to see if data corresponding to the address already exists in the software data cache (step 712). If at step 712 the data is already in the software data cache, the compiler determines if there is another pf register call in the pf do loop (step 714). If at step 714 there is another pf register call in the pf do loop, then the operation returns to step 712. If at step 714 there is not another pf register call in the pf do loop, the operation ends. If at step 712 the data is not in the software data cache yet, the compiler determines if the prefetch will cause an associativity conflict (step 716). If at step 716 the prefetch of the pf register will cause an associativity conflict, the compiler stops prefetching and resets the pf lb to the iteration value where the prefetching was stopped (step 718), with the operation continuing to step 710. If at step 716 the prefetch of the pf register fails to cause an associativity conflict, the compiler uses the address array and the size of data recorded in the temporary array to prefetch the irregular memory reference (step 720), with the operation proceeding to step 714 thereafter.

Figure 8:
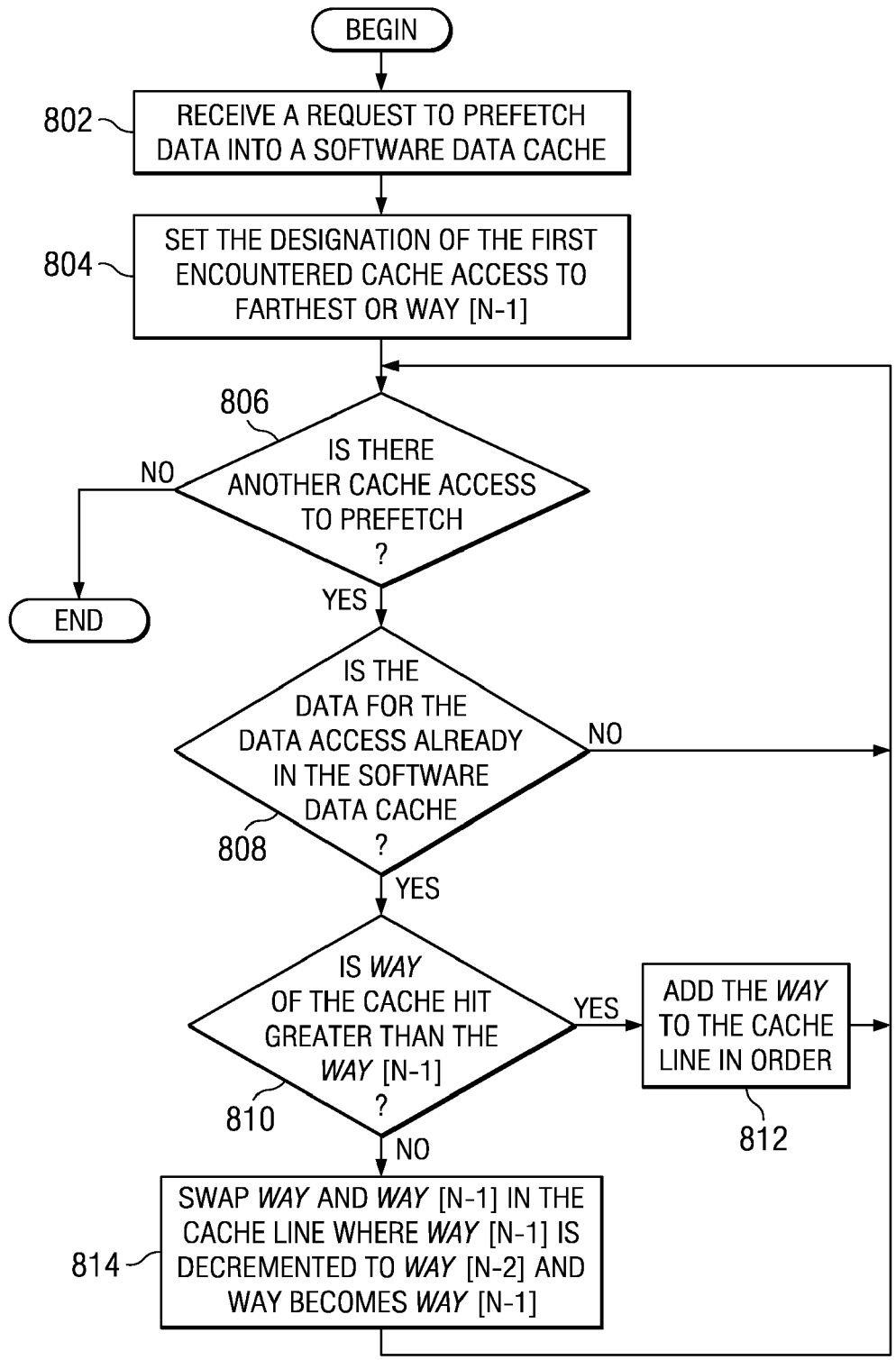
FIG. 8 is an exemplary flow diagram of an operation for replacing a cache block using a look-ahead policy to determine which cache block should be used in accordance with one illustrative embodiment.

FIG. 8 is an exemplary flow diagram of an operation for replacing a cache block using a look-ahead policy to determine which cache block should be used in accordance with one illustrative embodiment. As the operation begins, a compiler receives a request to prefetch data into a software data cache (step 802). The software cache runtime library sets the designation of the first encountered cache access to farthest or way [N−1] (step 804). Then the software cache runtime library determines if there is another cache access in the loop to prefetch (step 806). If at step 806 there is not another cache access in the loop then the cache line contains only one cache access and the operation ends. However, if at step 806 the software cache runtime library determines that there is another cache access in the loop, the software cache runtime library determines if the data for the data access is already in the software cache (step 808).

If at step 808 the software cache runtime library determines that the data is not already in the software data cache, the operation returns to step 806. If at step 808 the software cache runtime library determines that the data is in the software data cache, the software cache runtime library determines if way of the cache hit is greater than the way [N−1] previously set (step 810). If at step 810 the way is greater than way [N−1], then the software cache runtime library adds the way to the cache line in order (step 812), with the operation returning to step 806 thereafter. If at step 810 the software cache runtime library determines that the way is less than way [N−1], then the software cache runtime library swaps the cache blocks where the way becomes way [N−1] and the previous way [N−1] is decremented by one to become way [N−2] (step 814), with the operation returning to step 806 thereafter.

Figure 9:
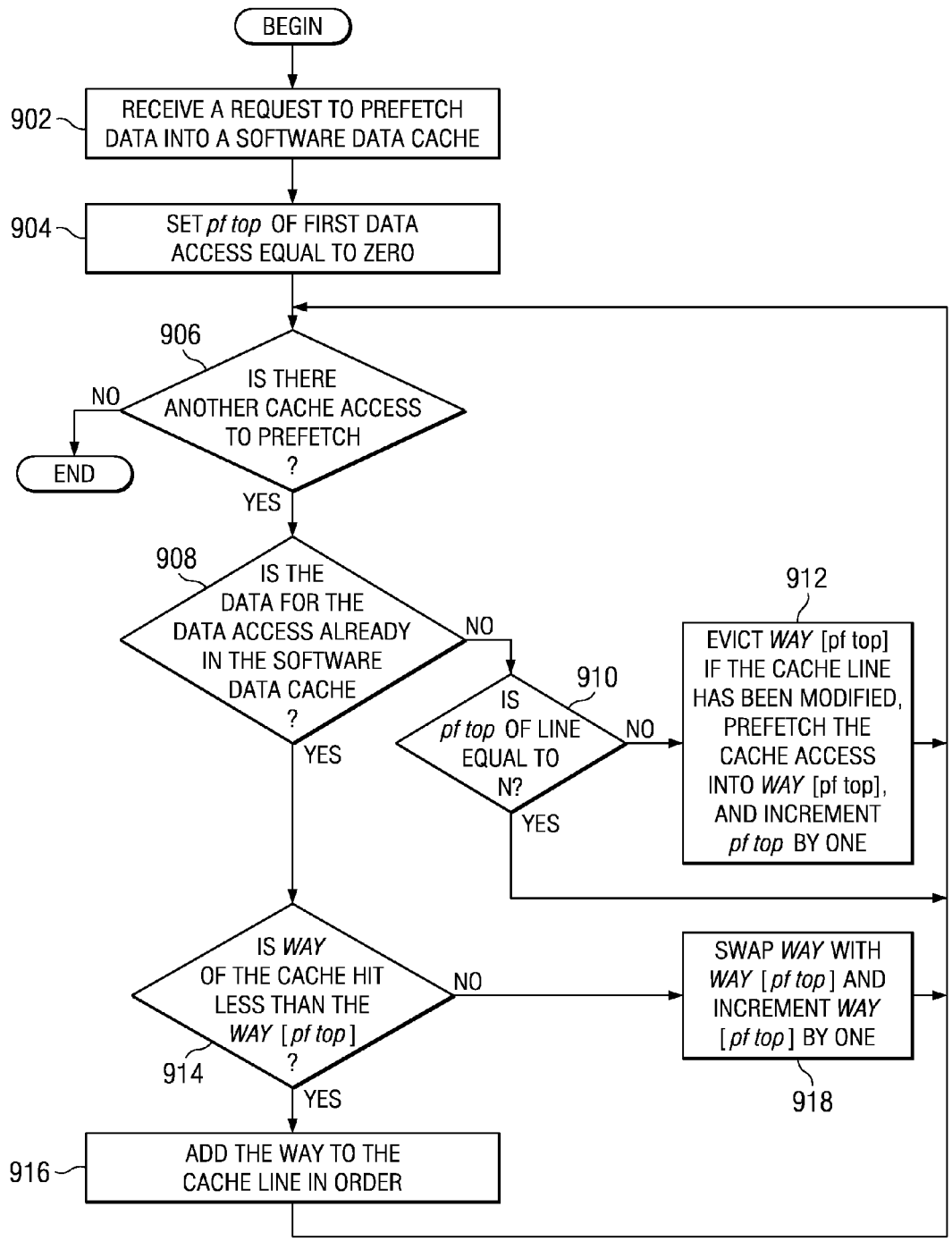
FIG. 9 is an exemplary flow diagram of an operation for determining which cache blocks have just been prefetched in accordance with one illustrative embodiment.

FIG. 9 is an exemplary flow diagram of an operation for determining which cache blocks have just been prefetched in accordance with one illustrative embodiment. As the operation begins, a compiler receives a request to prefetch data into a software data cache (step 902). For each loop in the program, the software cache runtime library sets pf top of the first data access equal to zero (step 904). Then the software cache runtime library determines if there is another cache access in the loop to prefetch (step 906). If at step 906 there is not another cache access in the loop then the cache line contains only one cache access and the operation ends. However, if at step 906 the software cache runtime library determines that there is another cache access in the loop, the software cache runtime library determines if the data for the data access is already in the software cache (step 908).

If at step 908 the software cache runtime library determines that the data is not already in the software data cache, then the software cache runtime library determines if pf top of cache line is equal to N (step 910). If at step 910 pf top is equal to N, then the operation returns to step 906. If at step 910 pf top is not equal to N, then the software cache runtime library evicts way [pf top] if the cache line has been modified, prefetches the cache access into way [pf top], and increments pf top by one (step 912), with the operation returning to step 906 thereafter. If at step 908 the software cache runtime library determines that there is a cache hit, the software cache runtime library determines if the way of the cache hit is less than the way [pf top] previously set (step 914). If at step 914 the way is less than way [pf top], then the software cache runtime library adds the way to the cache line in order (step 916), with the operation returning to step 906 thereafter. If at step 914 the way is greater than way [pf top], then the cache blocks are swapped where the way becomes way [pf top] and the previous way [pf top] is incremented by one (step 918), with the operation returning to step 906 thereafter.

Thus, in one illustrative embodiment, a mechanism is provided for prefetching irregular memory references accessed through a software data cache that is built upon hardware. The mechanisms simplify the synchronization required when prefetching into software data cache, overlap DMA operations for misses, and avoid frequent context switching to the miss handler. In another illustrative embodiment, a mechanism is provided for dynamically prefetching irregular memory references based upon encountered associativity conflicts. In yet another illustrative embodiment, cache pollution is minimized by using either a look-ahead policy or a look-back policy.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for reducing cache pollution of a software controlled cache using a look-ahead policy, the method comprising:

receiving a request to prefetch data into the software controlled cache;

setting a first designator for a first cache access to a first value;

determining if there is a second cache access to prefetch;

responsive to a determination that there is the second cache access to prefetch, determining if data associated with the second cache access exists in the software controlled cache;

responsive to a determination that the data associated with the second cache access exists in the software controlled cache, determining if a second value of a second designator associated with the second cache access is greater than the first value of the first cache access;

responsive to the second value failing to be greater than the first value, swapping the position of the first cache access and the second cache access in a cache line;

decrementing the first value by a predetermined amount thereby forming a third value, wherein the first data access has a first designator equal to the third value; and replacing the second value to equal the first value, wherein the second data access has a second designator equal to the first value.

2. The method of claim 1, further comprising:

responsive to the second value being greater than the first value, prefetching the data associated with the second cache access into the software controlled cache in order.

3. The method of claim 1, further comprising:

responsive to a determination that the data associated with the second cache access fails to exist in the software controlled cache, prefetching the data associated with the second cache access into the software controlled cache in order.

4. The method of claim 1, further comprising:

responsive to receiving the request to prefetch the data into the software controlled cache, setting a variable associated with the first cache access equal to zero;

responsive to a determination that the data associated with the second cache access exists in the software controlled cache, determining if the second value of the second designator associated with the second cache access is less than the variable;

responsive to the second value failing to be less than the variable, swapping the position of the first cache access and the second cache access in the cache line; and incrementing the variable by a predetermined amount.

5. The method of claim 4, further comprising:

responsive to the second value being less than the variable, prefetching the data associated with the second cache access into the software controlled cache in order.

6. The method of claim 4, further comprising:

responsive to a determination that the data associated with the second cache access fails to exist in the software controlled cache, determining if the variable is equal to a predetermined number;

responsive to the variable being equal to the predetermined number, evicting the first data access;

prefetching the data associated with the second cache access into the software controlled cache; and incrementing the variable by the predetermined amount.

7. The method of claim 6, further comprising:

responsive to the variable failing to equal the predetermined number, prefetching the data associated with the second cache access into the software controlled cache in order.

8. A computer program product comprising a computer-readable storage medium having a computer readable program stored thereon, wherein the computer readable program, when executed on a computing device, causes the computing device to:

receive a request to prefetch data into the software controlled cache;

set a first designator for a first cache access to a first value;

determine if there is a second cache access to prefetch;

responsive to a determination that there is the second cache access to prefetch, determine if data associated with the second cache access exists in the software controlled cache;

responsive to a determination that the data associated with the second cache access exists in the software controlled cache, determine if a second value of a second designator associated with the second cache access is greater than the first value of the first cache access;

responsive to the second value failing to be greater than the first value, swap the position of the first cache access and the second cache access in a cache line;

decrement the first value by a predetermined amount thereby forming a third value, wherein the first data access has a first designator equal to the third value; and replace the second value to equal the first value, wherein the second data access has a second designator equal to the first value.

9. The computer program product of claim 8, wherein the computer readable program further causes the computing device to:

responsive to the second value being greater than the first value, prefetch the data associated with the second cache access into the software controlled cache in order; and responsive to a determination that the data associated with the second cache access fails to exist in the software controlled cache, prefetch the data associated with the second cache access into the software controlled cache in order.

10. The computer program product of claim 8, wherein the computer readable program further causes the computing device to:

responsive to receiving the request to prefetch the data into the software controlled cache, set a variable associated with the first cache access equal to zero;

responsive to a determination that the data associated with the second cache access exists in the software controlled cache, determine if the second value of the second designator associated with the second cache access is less than the variable;

responsive to the second value failing to be less than the variable, swap the position of the first cache access and the second cache access in the cache line; and increment the variable by a predetermined amount.

11. The computer program product of claim 10, wherein the computer readable program further causes the computing device to:

responsive to the second value being less than the variable, prefetch the data associated with the second cache access into the software controlled cache in order.

12. The computer program product of claim 10, wherein the computer readable program further causes the computing device to:

responsive to a determination that the data associated with the second cache access fails to exist in the software controlled cache, determine if the variable is equal to a predetermined number;

responsive to the variable being equal to the predetermined number, evict the first data access;

prefetch the data associated with the second cache access into the software controlled cache; and increment the variable by the predetermined amount.

13. The computer program product of claim 12, wherein the computer readable program further causes the computing device to:

responsive to the variable failing to equal the predetermined number, prefetch the data associated with the second cache access into the software controlled cache in order.

14. An apparatus, comprising:

a processor; and a memory coupled to the processor, wherein the memory comprises instructions which, when executed by the processor, cause the processor to:

receive a request to prefetch data into the software controlled cache;

set a first designator for a first cache access to a first value;

determine if there is a second cache access to prefetch;

responsive to a determination that there is the second cache access to prefetch, determine if data associated with the second cache access exists in the software controlled cache;

responsive to a determination that the data associated with the second cache access exists in the software controlled cache, determine if a second value of a second designator associated with the second cache access is greater than the first value of the first cache access;

responsive to the second value failing to be greater than the first value, swap the position of the first cache access and the second cache access in a cache line;

decrement the first value by a predetermined amount thereby forming a third value, wherein the first data access has a first designator equal to the third value; and replace the second value to equal the first value, wherein the second data access has a second designator equal to the first value.

15. The apparatus of claim 14, wherein the instructions further cause the processor to:

responsive to the second value being greater than the first value, prefetch the data associated with the second cache access into the software controlled cache in order; and responsive to a determination that the data associated with the second cache access fails to exist in the software controlled cache, prefetch the data associated with the second cache access into the software controlled cache in order.

16. The apparatus of claim 14, wherein the instructions further cause the processor to:

responsive to receiving the request to prefetch the data into the software controlled cache, set a variable associated with the first cache access equal to zero;

responsive to a determination that the data associated with the second cache access exists in the software controlled cache, determine if the second value of the second designator associated with the second cache access is less than the variable;

responsive to the second value failing to be less than the variable, swap the position of the first cache access and the second cache access in the cache line; and increment the variable by a predetermined amount.

17. A method, in a data processing system, for reducing cache pollution of a software controlled cache using a lookback policy, the method comprising:

receiving a request to prefetch data into the software controlled cache;

setting a variable associated with a first cache access equal to zero;

determining if there is a second cache access to prefetch;

responsive to a determination that there is the second cache access to prefetch, determining if data associated with the second cache access exists in the software controlled cache;

responsive to a determination that the data associated with the second cache access exists in the software controlled cache, determining if a value of a designator associated with the second cache access is less than the variable;

responsive to the value failing to be less than the variable, swapping the position of the first cache access and the second cache access in a cache line; and incrementing the variable by a predetermined amount.

18. The method of claim 17, further comprising:

responsive to the value being less than the variable, adding the second cache access to the cache line in order.

19. The method of claim 17, further comprising:

responsive to a determination that the data associated with the second cache access fails to exist in the software controlled cache, determining if the variable is equal to a predetermined number;

responsive to the variable being equal to the predetermined number, evicting the first data access;

prefetching the data associated with the second cache access into the software controlled cache; and incrementing the variable by the predetermined amount.

20. The method of claim 19, further comprising:

responsive to the variable failing to equal the predetermined number, prefetching the data associated with the second cache access into the software controlled cache in order.

\* \* \* \* \*